US005538300A

United States Patent [19]
Brown

[11] Patent Number: 5,538,300
[45] Date of Patent: Jul. 23, 1996

[54] CABLE LOCK AND SEAL DEVICE

[75] Inventor: Clive A. Brown, Birmingham, England

[73] Assignee: Blair Security Products Limited, West Midlands, England

[21] Appl. No.: 302,860

[22] PCT Filed: Mar. 11, 1993

[86] PCT No.: PCT/GB93/00515

§ 371 Date: Dec. 19, 1994

§ 102(e) Date: Dec. 19, 1994

[87] PCT Pub. No.: WO93/18316

PCT Pub. Date: Sep. 16, 1993

[30] Foreign Application Priority Data

Mar. 13, 1992 [GB] United Kingdom .......... 9205565
Jul. 7, 1992 [GB] United Kingdom .......... 9214385

[51] Int. Cl.$^6$ .......................... G09F 3/03; F16G 11/04
[52] U.S. Cl. .................. 292/307 R; 292/323; 24/136 A
[58] Field of Search .................. 292/317, 323, 292/325, 307 A, 329; 24/136 A, 136 R, 115 H; 403/329

[56] References Cited

U.S. PATENT DOCUMENTS

| | | | |
|---|---|---|---|
| 1,218,752 | 3/1917 | Farr | 24/136 A |
| 1,628,744 | 5/1927 | Rose | 24/136 |
| 2,401,418 | 6/1946 | Everley | 24/126 |
| 2,606,350 | 8/1952 | French | 24/136 A |
| 3,239,255 | 3/1966 | Murcott | 403/329 |
| 4,640,538 | 2/1987 | Brammall | 292/323 |
| 4,707,891 | 11/1987 | Chidester | 24/136 A |
| 4,747,631 | 5/1988 | Loynes et al. | 24/136 A |
| 4,878,269 | 11/1989 | Anscher et al. | 24/136 R |
| 5,222,776 | 6/1993 | Georgopoulos et al. | 292/323 |
| 5,352,003 | 10/1994 | By Stry | 292/323 |

FOREIGN PATENT DOCUMENTS 2388114  11/1978  France .................. E05C 13/02

Primary Examiner—Steven N. Meyers
Assistant Examiner—Tuyet-Phuong Pham
Attorney, Agent, or Firm—Lawrence A. Maxham; Baker, Maxham, Jester & Meador

[57] ABSTRACT

In a cable lock and seal device a roller is rotatable about a single axis normal to the axis of an inextensible member and with respect to a ramp which, in turn, is inclined with respect to the axis of the inextensible member. The roller is moveable up and down the ramp between a retracted position in which the member can be drawn through a passage in which the device and a locking position in which the roller rolls up the ramp to clamp the member against movement in the opposite direction with the member trapped between the roller and the opposite face of the passage. A spring acts on the roller to urge it up the ramp at all times.

20 Claims, 3 Drawing Sheets

CABLE LOCK AND SEAL DEVICE

BACKGROUND OF THE INVENTION

The invention relates to cable lock and seal devices, of the kind consisting of a body enclosing a spring held friction member and having a passage therethrough and a flexible inextensible member having one end attached to the body, the opposite end being adapted to pass through the passage and engage the friction member therein.

A cable lock device of the kind set forth is described in U.S. 830,565. The passage in this device contains within it a larger chamber divided into upper and lower parts by a leaf spring. A small ball of diameter larger than that of the passage is held in the chamber. If the ball is above the leaf spring as the inextensible member passes down through the passage, the ball overcomes the force of the leaf spring and is held in a space defined by the leaf spring, the member and a stop provided in the lower part of the chamber. When an attempt is made to withdraw the inextensible member the ball is rolled between the moving inextensible member and the leaf spring due to the friction between the two. The ball overcomes the force of the leaf spring and continues to move upwards until it becomes wedged between the inextensible member and an inclined wall of the chamber which meets the passage-way. The inextensible member is thus held fast and cannot be removed from the locking device.

In a cable lock and seal device of the kind set forth in which the friction member comprises a ball, there is a tendency for the ball to rotate relative to the body in response to a force applied to the ball from the helically arranged strands which comprise the inextensible member and when a force is applied to the member in a longitudinal direction. Thus, when a sufficient force is applied to the member longitudinally, it can be withdrawn from the body with the ball rotating in a path as dictated by its engagement with the inextensible member.

SUMMARY OF THE INVENTION

According to our invention in a cable lock and seal device comprising a body enclosing a spring held friction member and having a passage therethrough and a flexible inextensible member having one end attached to the body, the opposite end being adapted to pass through the passage and engage the friction member therein in which the friction member comprises a roller which is rotatable about a single axis normal to the axis of the inextensible member and with respect to a ramp, in turn, inclined with respect to the axis of the inextensible member with which the roller co-operates during movement between a retracted position in which the inextensible member can be drawn through the first passage and a locking position in which the roller rolls up the ramp to clamp the inextensible member against movement in the opposite direction with the member trapped between the roller and the opposite face of the first passage, a spring acting on the roller to urge it up the ramp at all times, and in which the spring comprises a leaf spring having a finger which extends into the passage at the lower end of the ramp and acts on the peripheral edge of the roller to bias it up the ramp towards its upper end, the finger comprising one of a pair of spaced limbs, and the second limb of the pair is contiguous with a skeletal base portion by means of which the spring is anchored in the body, the first limb being deflectable with respect to the second limb, and the second limb being deflectable with respect to the base portion.

The ramp enhances the grip of the roller against the inextensible member.

Since the roller can rotate about its single axis it resists any forces applied to it in the said opposite direction, which may be applied from helically arranged strands.

The peripheral edge or surface of the roller may be roughened or otherwise serrated to enhance its grip with the inextensible member.

The peripheral edge or surface of the roller may also be formed with one or more circumferentially extending Vee grooves which enhance the grip on the member and centralise the roller in the passage.

In another construction the peripheral edge or surface of the roller is formed with an annular groove complementary in outline to the profile of the cable. For example the groove may be of part-circular outline, or shallow Vee-outline.

The groove itself may be divided into a central land disposed between axially spaced lands at opposite sides of the roller.

The body may be of composite construction comprising the hollow outer casing, and the ramp block which is contained in the casing and which is mounted centrally in the casing to define the first passage and a second passage spaced parallel to one another between the casing and the side edges of the block, one of the edges of the block being adapted to define the ramp and an anchorage for the leaf spring.

Conveniently the outer casing comprises an extrusion, suitably of aluminium, and the block has local recess into which the material of the casing is deformed to stake one end portion of the inextensible member, the casing, and the block together.

BRIEF DESCRIPTION OF THE DRAWING

Two embodiments of our invention are illustrated in the accompanying drawings in which.

DETAILED DESCRIPTION OF THE PREFERRED EMBODIMENTS

Figure 1:
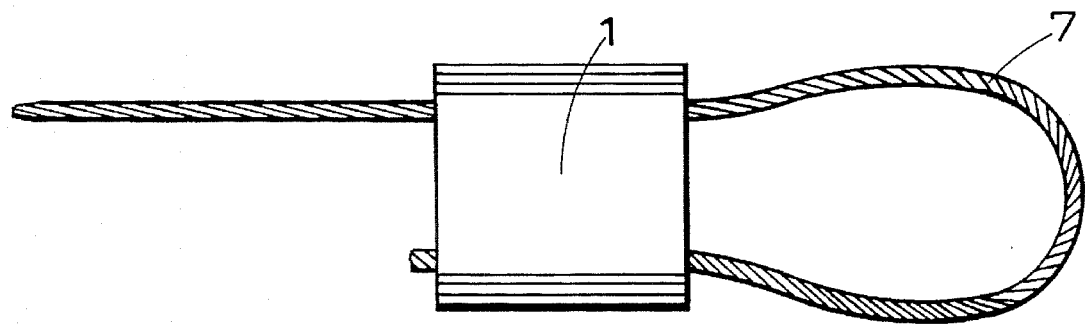
FIG. 1 is a view of one side of a cable lock and seal device.
Figures 2, 3:
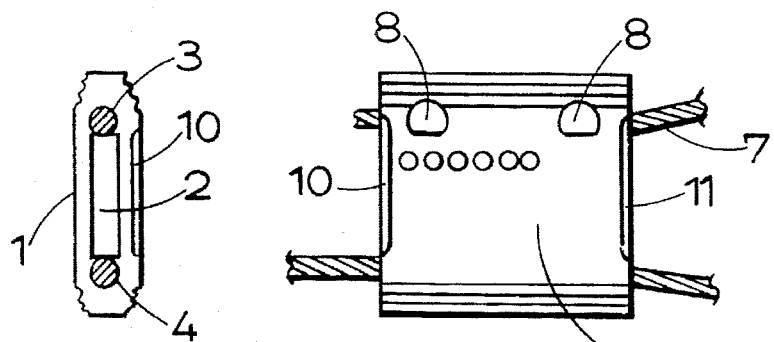
FIG. 2 is a view of the other side of the device.
FIG. 3 is an end view of the device.
Figure 4:
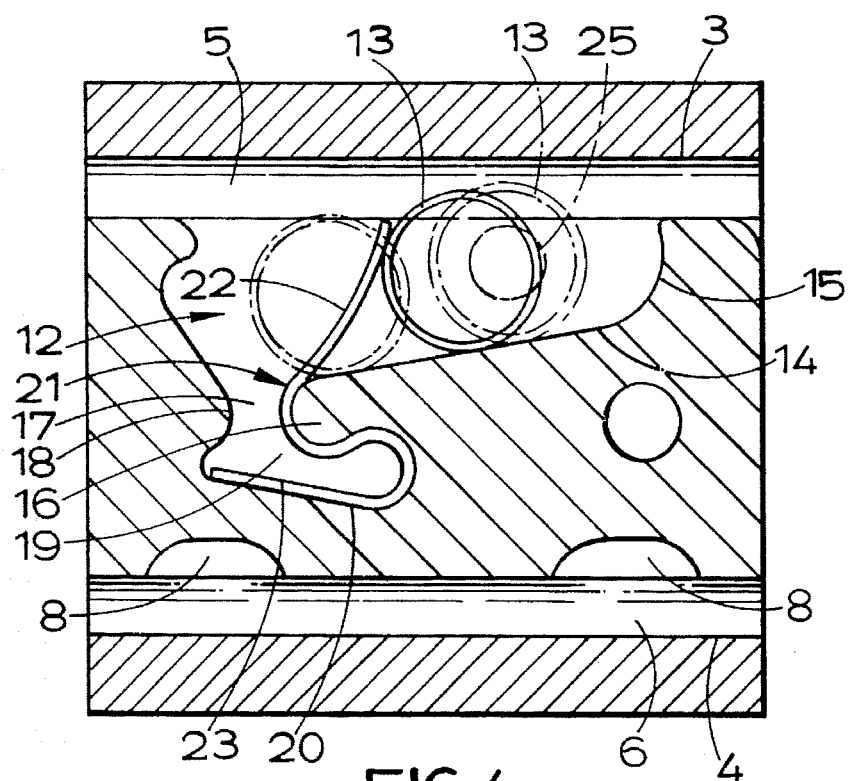
FIG. 4 is a longitudinal section through the device in the attitude shown in FIG. 1.

The cable lock and seal device illustrated in FIGS. 1–8 of the accompanying drawings comprises an outer hollow casing 1 of generally oblong rectangular outline, suitably in the form of a hollow aluminium extrusion, and a ramp block 2 in the form of a metal pressing which is received in the casing 1. Internal edges 3,4 of the casing are of part circular outline subtending angles of substantially more than 180° so that, together with the edges of the pressing 2, they define passages 5,6 for the passage of an inextensible member, suitably a helically stranded cable 7.

One of the edges of the pressing 2 is provided with a pair of axially spaced recesses or scallops 8. When the cable 7 is passed through the passage 6, the material of the casing can be deformed or displaced from both sides into the scallops 8 and onto the cable 7. This stakes that portion of the cable 7, the casing 1 and the block 2 together against relative movement in any direction.

The ends of the casing 1 may be deformed inwardly over the corresponding, radiused end edges, of the block 2 to form chamfers 10 and 11. This increases security and improves the appearance of the device. The block 2 itself is otherwise fully enclosed within the casing 1 for maximum security.

The edge of the block 2 remote from the scallops 8 is provided with a cut-out or open sided recess 12 to accommodate a roller 13. As illustrated the recess 12 defines a ramp face 14 which is inclined with respect to the axis of the passage 5. At its upper end the ramp face 14 terminates in a part-circular stop face 15, and at its lower end the ramp face 14 terminates in a radiused nose 16 which defines a restriction 17 between itself and a similar, smaller, nose 18. The restriction leads into an enlarged opening 19 including a straight abutment, base, face 20 inclined with respect to the passage 5.

A leaf spring 21 is located in the recess 12. The leaf spring 21 comprises a radial finger 22 which projects towards the passage 5 and co-operates with the peripheral edge of the roller 13 at a position opposite the stop face 15, and a skeletal base 23 which is integral with the finger 22 and forms an anchorage for the spring 21. The base 23 follows the contours of the nose 16 and is turned back on itself to lie against the abutment face 20. Normally, when no cable is present, the spring 21 acts to urge the roller up the ramp and towards the stop face 15.

When the free, unattached, end of the cable 7 is inserted into the passage 5 from the end adjacent to the stop face 15, the cable 7 co-operates with the roller 13 to cause the roller to roll down the ramp 14 against the force in the spring 21 by frictional engagement, and the finger 22 is caused to deflect back against the nose 16 as a pivot.

Any tendency for the cable 7 to be withdrawn from the passage 5 in the opposite direction is prevented by the imprisonment or trapping of the cable 7 between the internal wall of the casing 1 and the roller 13.

The peripheral edge of the roller 13 may be roughened or serrated to enhance the grip with the cable 7, and it may also be provided with a pair of axially spaced circumferentially extending grooves which centralise the roller 13 and tend to cause the roller to bite into the cable 7.

The roller 13 may be provided with stubs 25 which also act to centralise the roller 13 in the casing 1, with the axial length of the roller including the stubs being slightly less than the width of the slot in the casing 1 in which the pressing 2 is received.

Figure 5:
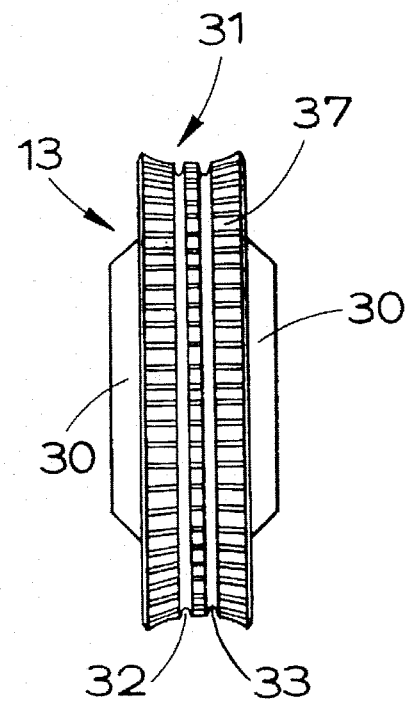
FIG. 5 is an end view of a modified roller.
Figure 6:
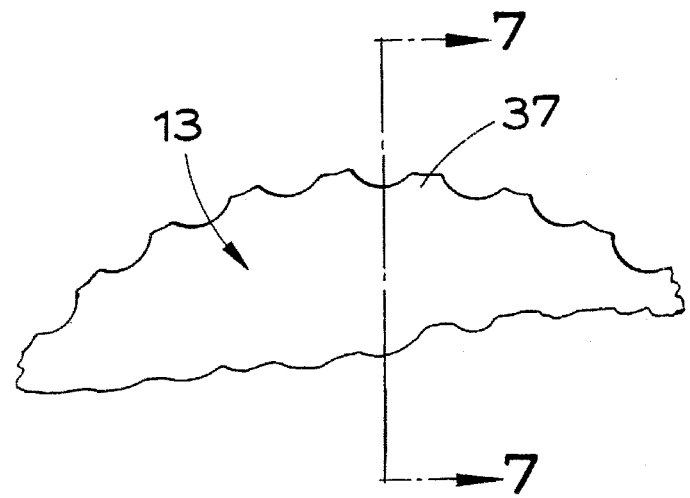
FIG. 6 is a side view of the same.
Figure 7:
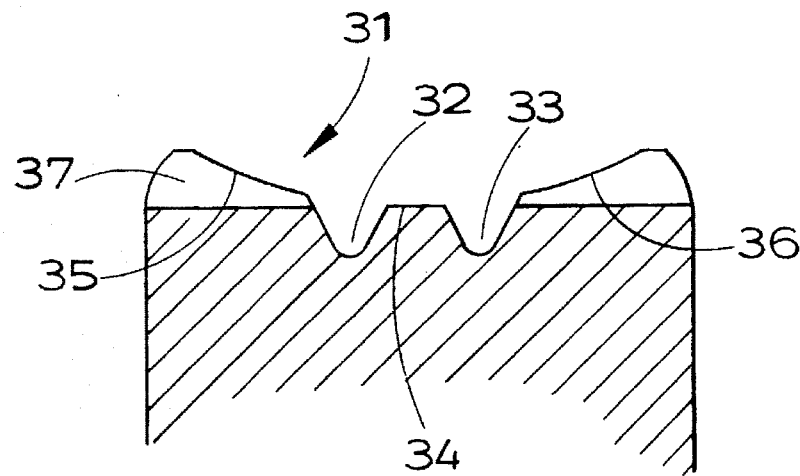
FIG. 7 is a section on line 7—7 of FIG. 6.

In the modified roller illustrated in FIGS. 5–7 of the accompanying drawings the roller 13 is provided with stubs 30 of increased, and of substantial, diameter. The peripheral edge or surface of the roller 13 is formed with an annular groove 31 complementary in outline to the profile of the cable 7. As illustrated the groove 31 is of part-circular outline of an internal radius slightly greater than that of the cable 7. The co-operation of the cable 7 with the curved surface of the groove 31 acts to centralise the roller 13 and prevent it from tilting which might otherwise cause it to jam within the casing 1, thereby impeding free rotation.

The surface of the groove 31 may also be relieved by the provision of an addition pair of axially spaced, circumferentially extending, grooves 32, 33 of Vee outline. This provides the groove 31 with a central land 34 and axially spaced side lands 35, 36 terminating at the sides of the roller 13, which facilitate co-operation with the cable 7.

The lands 34, 35 and 36 are roughened or serrated by the provision at angularly spaced teeth 37 which enhance the grip with the cable.

In a modification the groove 31 may be of shallow Vee-outline.

Figure 8:
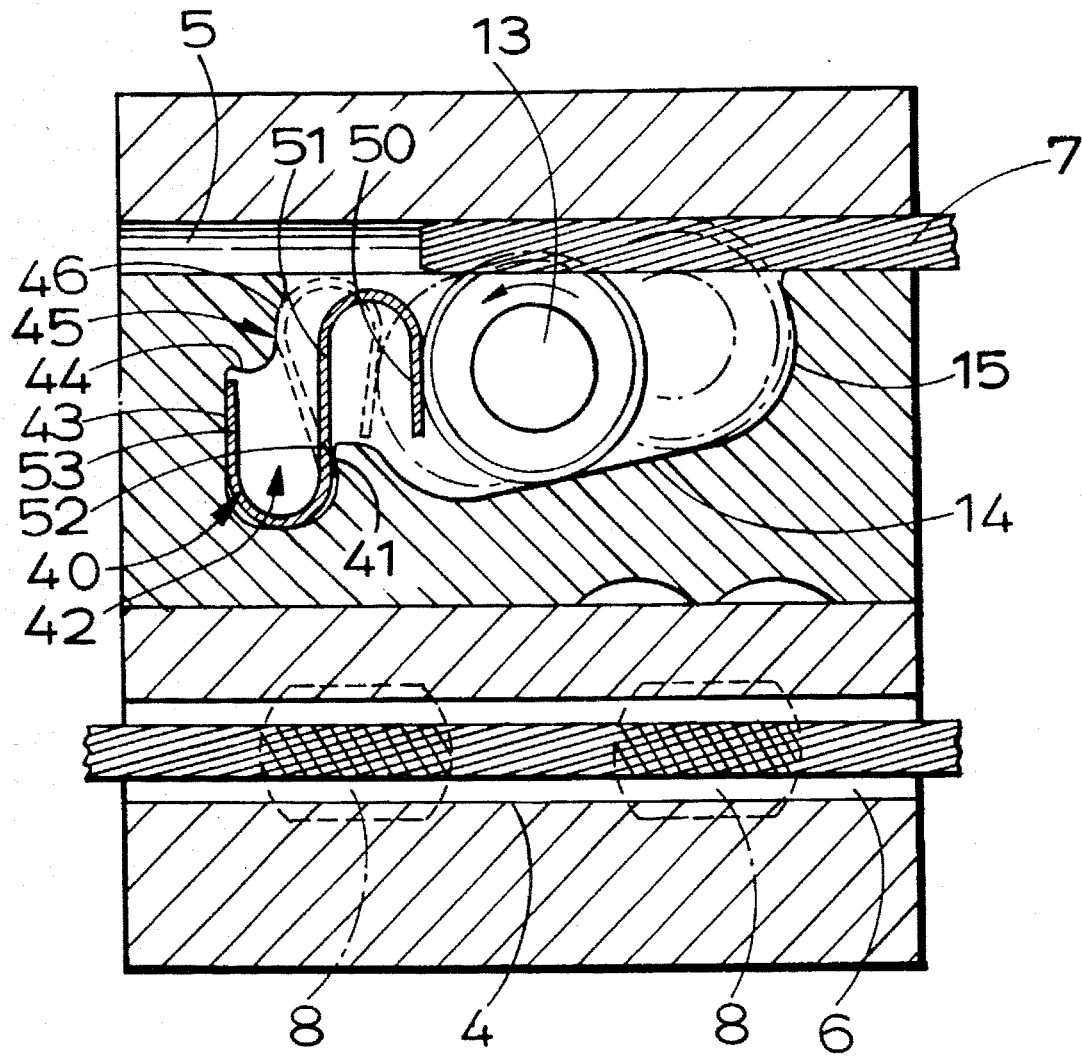
FIG. 8 is a view similar to FIG. 4 but showing a modified construction.

In the cable lock and seal device illustrated in FIG. 8 of the accompanying drawings the portion of the open sided recess 12 at the end of the ramp face 14 remote from the stop face 15 is of a different outline, and the spring 21 is replaced by a spring 40 of a different configuration.

As illustrated the ramp face 14 at its lower end leads into an inwardly directed lip 41 defining one side wall of a channel 42 of U outline, and of which the opposite side wall at its upper end terminates in a inwardly directed shoulder 44. A face 45 extending from the shoulder 44 to the passage 5 is provided with a shallow recess 46 of arcuate outline.

The spring 40 is of generally 'S' outline comprising oppositely directed pairs of U shaped limbs 50, 51, 52, 53 of which adjacent limbs 51, 52 of each pair are contiguous. The outer limb 50 of the inner pair defines a finger which acts against the roller 13, and the limbs 52 and 53 which define a skeletal base portion are retained in the channel 42 with the stop face 43 acting to prevent movement of the spring 40 towards the passage 5.

Normally, when no cable is present, the spring 40 acts to urge the roller 13 up the ramp 14 and towards the stop face 15 by the engagement with it of the limb 50.

When the free, unattached, end of the cable 7 is inserted into the passage 5 from the end adjacent to the stop face 15 and the cable co-operates with the roller 13 as described above, to cause the roller 13 to roll down the ramp, the spring 40 deflects towards the shallow recess 46 with the limb 50 moving towards the limb 51, and the limb 51, in turn, moving angularly relatively towards the limb 53 and the recess 46.

The construction and operation of the cable lock and seal device of FIG. 8 is otherwise the same as that of the construction described with references to FIGS. 1–7, and corresponding reference numerals have been applied to corresponding parts.

What is claimed is:

1. A cable lock and seal device comprising a body enclosing a friction member and having a passage therethrough a flexible inextensible member having one end attached to the body and having a second opposite end, the second opposite end being adapted to pass through the passage along an axis engage the friction member therein, in which the friction member comprises a roller, the roller having a periphery, the roller being rotatable about a single axis normal to the axis of the inextensible member and with respect to a ramp, in turn, inclined with respect to the axis of the inextensible member with which the roller cooperates during movement, the ramp having a lower upper end, the roller having a retracted position in which the inextensible member can be drawn through the passage and a locking position in which the roller rolls up the ramp to clamp the inextensible member against movement in an opposite direction to the direction of drawing with the member trapped between the roller and an opposing face of the passage, a spring acting on the roller to urge it up the ramp at all times, and in which the spring comprises a leaf spring having a linger and a portion, the finger extending into the passage at the lower end of the ramp and acting on periphery of the roller to bias it up the ramp toward its upper end, wherein the improvement comprises the finger which comprises one of a pair of spaced limbs, so providing a first and a second limb, where the second limb of the pair and said base portion are contiguous with a skeletal base portion of the body by means of which the spring is retained in the body, an opening being provided between the second limb and base portion, the first limb being deflectable with respect to the second limb, and the second limb being deflectable into said opening with respect to the base portion which anchors the leaf spring.

2. The device recited in claim 1, in which the periphery of the roller is roughened or otherwise serrated to enhance its grip with the inextensible member.

3. The device recited in claim 2, in which the periphery of the roller is formed with an annular groove, said flexible inextensible member having a profile and where said annular groove is complementary in outline to the profile of the flexible inextensible member.

4. The device recited in claim 2, in which the periphery of the roller is also formed with at least one circumferentially extending V-groove which enhances the grip on the member and centralises the roller in the passage.

5. The device recited in claim 4, in which the periphery of the roller is formed with an annular groove, said flexible inextensible member having a profile and where said annular groove is complementary in outline to the profile of the flexible inextensible member.

6. The device recited in claim 4, in which the groove itself is divided into a central land disposed between axially spaced lands at opposite sides of the roller.

7. The device recited in claim 6, in which the body is of composite construction comprising a hollow outer casing, and a ramp block, having side edges, which is contained in the casing and which is mounted centrally in the casing so that a pair of spaced parallel passages are defined between the casing and the side edges of the block, one of the side edges of the block being adapted to define the ramp and an anchorage for the leaf spring.

8. The device recited in claim 7, in which the casing is formed from an extruded material and the block has local recess into which the material of the casing is deformed to stake one end portion of the inextensible member, the casing, and the block together.

9. The device recited in claim 4, in which the body is of composite construction comprising a hollow outer casing, and a ramp block, having side edges, which is contained in the casing and which is mounted centrally in the casing so that a pair of spaced parallel passages are defined between the casing and the side edges of the block, one of the side edges of the block being adapted to define the ramp and an anchorage for the leaf spring.

10. The device recited in claim 9, in which the casing is formed from an extruded material and the block has a local recess into which the material of the casing is deformed to stake one end portion of the inextensible member, the casing, and the block together.

11. The device recited in claim 1, in which the periphery of the roller is formed with an annular groove, said flexible inextensible member having a profile and where said annular groove is complementary in outline to the profile of the flexible inextensible member.

12. The device recited in claim 11, in which the groove itself is divided into a central land disposed between axially spaced lands at opposite sides of the roller.

13. The device recited in claim 11, in which the groove is of part-circular outline.

14. The device recited in claim 13, in which the groove itself is divided into a central land disposed between axially spaced lands at opposite sides of the roller.

15. The device recited in claim 11, in which the groove is of shallow V-outline.

16. The device recited in claim 15, in which the groove itself is divided into a central land disposed between axially spaced lands at opposite sides of the roller.

17. The device recited in claim 11, in which the body is of composite construction comprising a hollow outer casing, and a ramp block, having side edges, which is contained in the casing and which is mounted centrally in the casing so that a pair of spaced parallel passages are defined between the casing and the side edges of the block, one of the side edges of the block being adapted to define the ramp and an anchorage for the leaf spring.

18. The device recited in claim 17, in which the casing is formed from an extruded material and the block has a local recess into which the material of the casing is deformed to stake one end portion of the inextensible member, the casing, and the block together.

19. The device recited in claim 1, which the body is of composite construction comprising a hollow outer casing, and a ramp block, having side edges, which is contained in the casing and which is mounted centrally in the casing so that a pair of spaced parallel passages are defined between the casing and the side edges of the block, one of the side edges of the block being adapted to define the ramp and an anchorage for the leaf spring.

20. The device recited in claim 19, in which the casing is formed from an extruded material and the block has a local recess into which the material of the casing is deformed to stake one end portion of the inextensible member, the casing, and the block together.

* * * * *